July 28, 1936.  E. F. McCONNELL  2,049,128
PIEPAN HOLDER
Filed June 25, 1935
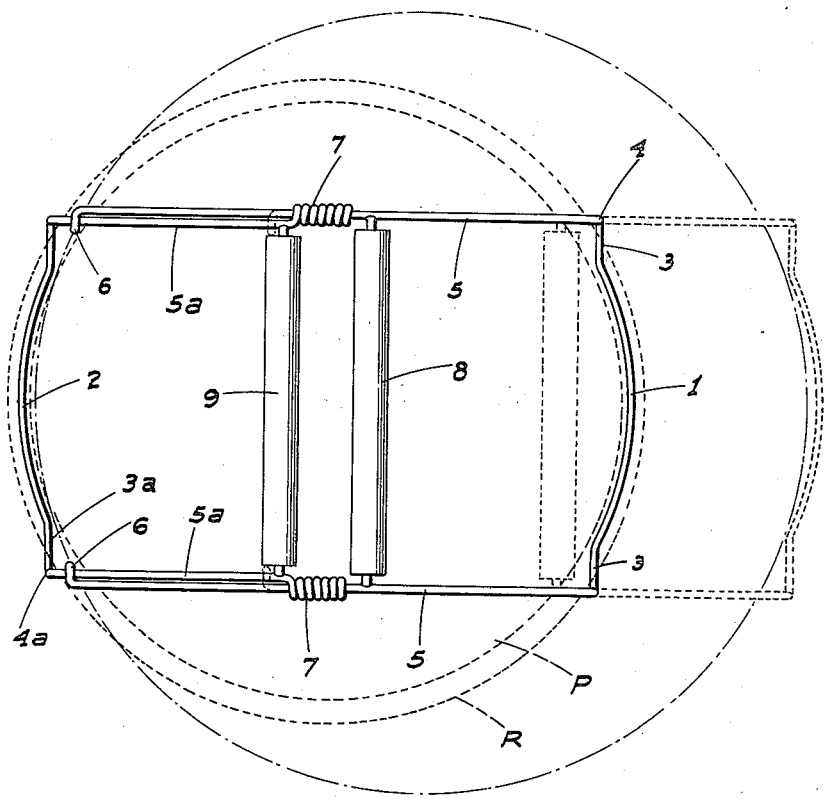
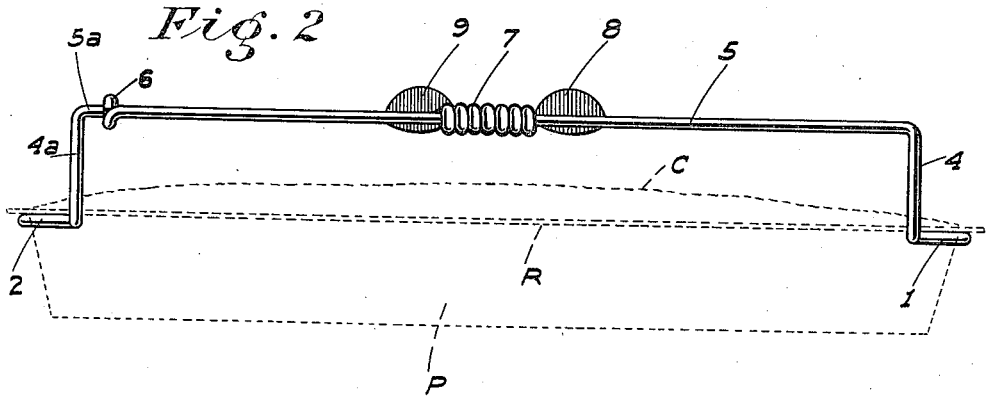
INVENTOR
Ellen F. McConnell
BY
ATTORNEY Patented July 28, 1936

2,049,128

UNITED STATES PATENT OFFICE 2,049,128

PIEPAN HOLDER

Ellen F. McConnell, Colusa, Calif.

Application June 25, 1935, Serial No. 28,280

2 Claims. (Cl. 294—34)

This invention relates to a culinary utensil and is directed particularly to a pie pan holder.

The principal object of my invention is to provide a pan holder which is adapted to engage and be used to lift a hot pan, as from an oven or the like. My pie pan holder is extremely easy to use and prevents many burns to the fingers and hands which often occur when only a piece of cloth or a common cloth pot holder is employed in an attempt to protect the hands from the hot pan.

An additional object of my invention is to provide an adjustable pan holder capable of spanning a pan having a diameter as great as thirteen inches.

A further object of the invention is to produce a simple and inexpensive device and yet one which will be exceedingly effective for the purpose for which it is designed.

These objects I accomplish by means of such structure and relative arrangement of parts as will fully appear by a perusal of the following specification and claims.

In the drawing similar characters of reference indicate corresponding parts in the several views:

Figure 1 is a top plan of my improved pie pan holder as engaging a standard size pan. This view also indicates in dotted lines the relative position of the parts of the holder when engaging an oversize pan.

Figure 2 is a side elevation illustrating my improved holder engaging a pie pan.

Referring now more particularly to the characters of reference on the drawing, the holder comprises two cooperating frame units each formed with an arcuate and inwardly facing jaw member, indicated as 1 and 2.

The arcuate jaw member 1 is formed at its ends with relatively short projections 3. Extending upwardly from the outer ends of these projections 3 are frame extensions 4. These frame extensions 4 are of sufficient length so that their upper ends extend up some distance above the normal level of the upper pie crust C in the pan P when the jaw members engage beneath the rim R of the pan.

Projecting horizontally from the upper ends of the frame extensions 4 are relatively long transversely spaced parallel frame elements 5 which terminate in eyes 6 bent at right angles.

The other frame unit from which the arcuate jaw 2 is supported comprises projections 3a, frame extensions 4a, and transversely spaced parallel frame elements 5a, all formed as hereinbefore described relative to the supporting frame unit for the jaw 1.

The frame elements 5a however slidably extend through the eyes 6 and thence alongside the frame elements 5 to a termination at coils 7. These are formed on the ends of said elements 5a and are arranged so as to serve as guide sleeves through which the elements 5 slide. The relative lengths of the frame elements 5 and 5a depends on the desired size of the holder and the size pan to be engaged by the holder. The amount of adjustment of the holder depends of course on the length of the elements between the eyes 6 and coils 7.

Handles 8 and 9 are secured in transverse relation to and between the pairs of spaced elements 5 and 5a respectively. The handle 8 is mounted between the elements 5 at a point along the elements which will cause it to be adjacent the coils 7 when the eyes 6 are adjacent the frame extensions 4a. The handle 9 is mounted between the elements 5a adjacent the inner ends of the coils 7. These handles, preferably of wood, have metal pins extending from each end and these pins are welded to the adjacent elements.

It will be noted from the drawing that the opposed frame units which support and include the arcuate jaws may each be formed from a single length of stiff wire bent to the shape as hereinbefore described. A relatively heavy galvanized iron wire is preferably used.

In use when it is desired to lift a hot pan, the handles 8 and 9 of the pan holder are moved apart which causes the jaws 1 and 2 to also move apart relative to each other, the coils 7 sliding along the elements 5 in one direction, and the eyes 6 sliding along the elements 5a in the other direction.

The holder is then taken in one hand and placed over the hot pie pan and the handles drawn together until the arcuate jaws have been drawn under the rim of the pan and into firm engagement with the sides of the pan. By firmly holding the handles the pie pan may then be readily lifted from the oven etc.

The jaws 1 and 2 are able to engage the side of the pan under the rim because of the projections 3 and 3a formed on the ends of each jaw. These projections extend out from under the rim a sufficient distance to allow the frame extensions 4 and 4a to extend upward without engaging against the rim of the pan.

Though especially adapted as a holder or lifter for hot pie pans, this holder may also be used on circular cake pans or any pan having a rim.

As well illustrated in Figure 2, the holder or the fingers of the person grasping the handles of the holder do not touch or damage the upper crust C of the pie when the holder is used to move a hot pie pan.

From the foregoing description it will be readily seen that I have produced such a device as substantially fulfills the objects of the invention as set forth herein.

While this specification sets forth in detail the present and preferred construction of the device, still in practice such deviations from such detail may be resorted to as do not form a departure from the spirit of the invention, as defined by the appended claims.

Having thus described my invention, what I claim as new and useful and desire to secure by Letters Patent is:

1. A pie pan holder comprising a pair of horizontal frame units, each of said units including a pair of transversely spaced frame elements, means on the end of each element of the frame units slidably engaging the corresponding element of the other frame unit, a handle connected to each unit and pan engaging jaws on the ends of the units; the handle of one frame unit being connected thereto substantially adjacent the ends of the frame elements, and the handle of the other frame unit being connected to said other frame unit intermediate the ends of the frame elements thereof whereby each handle may be symmetrically positioned relative to the center of a pan held in the holder.

2. A device as in claim 1 in which the handles extend transversely between the frame elements and are parallel to each other.

ELLEN F. McCONNELL.